United States Patent [19]
Schofield et al.

[11] Patent Number: 5,621,836
[45] Date of Patent: Apr. 15, 1997

[54] PLASTIC FIBER ALIGNMENT FERRULE AND TERMINATION METHOD

[75] Inventors: Philip W. Schofield, Oak Park; Michael A. Reed, Norridge; Kenneth Marchman, Chicago, all of Ill.

[73] Assignee: Methode Electronics, Inc., Chicago, Ill.

[21] Appl. No.: 345,620

[22] Filed: Nov. 28, 1994

[51] Int. Cl.$^6$ .................................................. G02B 6/36
[52] U.S. Cl. .................... 385/80; 385/85; 385/76
[58] Field of Search ................... 385/80, 85, 76, 385/60, 72, 102, 104; 156/332

[56] References Cited

U.S. PATENT DOCUMENTS

| | | | |
|---|---|---|---|
| Re. 34,122 | 11/1992 | Sheehan et al. | 156/327 |
| 3,449,273 | 6/1969 | Kettenring et al. | 260/18 |
| 3,488,715 | 1/1970 | Atkins | 161/203 |
| 3,988,299 | 10/1976 | Malofsky | 156/332 X |
| 4,018,733 | 4/1977 | Lopez et al. | 260/27 |
| 4,037,922 | 7/1977 | Claypoole | 385/104 |
| 4,092,193 | 5/1978 | Brooks | 156/83 |
| 4,148,775 | 4/1979 | Shima et al. | 260/30.8 R |
| 4,253,901 | 3/1981 | Aslakson | 156/327 |
| 4,509,820 | 4/1985 | Murata et al. | 350/96.21 |
| 4,642,421 | 2/1987 | Dery et al. | 174/88 R |
| 4,725,117 | 2/1988 | Ellis | 350/96.2 |
| 4,731,503 | 3/1988 | Kitanishi | 174/88 R |
| 4,735,847 | 4/1988 | Fujiwara et al. | 428/209 |
| 4,770,487 | 9/1988 | Williams | 385/80 |
| 4,964,689 | 10/1990 | Wichansky | 350/96.21 |
| 4,984,865 | 1/1991 | Lee et al. | 350/96.2 |
| 5,193,133 | 3/1993 | Schofield et al. | 385/85 |
| 5,333,223 | 7/1994 | Schofield et al. | 385/84 |

OTHER PUBLICATIONS

3M Product Bulletin *6100 Hot Melt Fiber Optic Connector* (4 pages) No Month No Year.

Loctite Corporation Material Safety Data Sheet, Oct. 7, 1994 on Locquic(R) Primer N 7649 (3 pages).

Loctite Corporation Material Safety Data Sheet, Oct. 7, 1994 on RC(TM) 680 Retaining Cmpd Hi Strength (3 pages) No Month No Year.

Loctite brochure entitled: "Primers/Activators/Solvents" (4 pages) No Month No Year.

Loctite Technical Data Sheet Product 7649 (1 page) No Month No Year.

*Primary Examiner*—John D. Lee
*Assistant Examiner*—Phan T. H. Palmer
*Attorney, Agent, or Firm*—David L. Newman

[57] ABSTRACT

An injection molded plastic fiber alignment ferrule is provided with a polishing pedestal. The ferrule has an opening therethrough for receiving the end of a fiber which is bonded therein by an anaerobic adhesive and extends beyond the pedestal. The fiber is cleaved and the end is severed. The ferrule is polished to remove the pedestal, resulting in a smoothly polished end surface.

10 Claims, 1 Drawing Sheet

U.S. Patent    Apr. 15, 1997    5,621,836
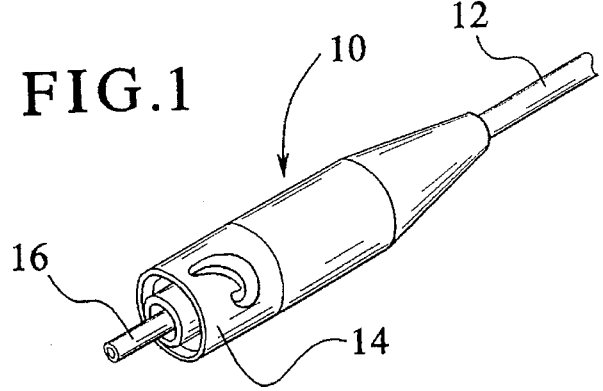
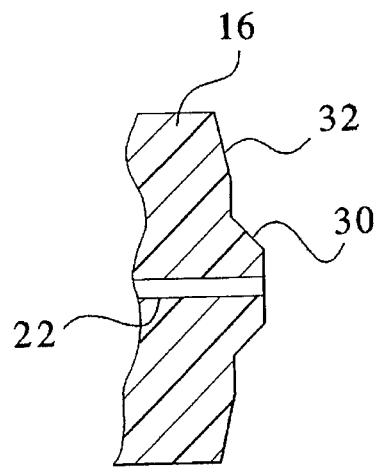
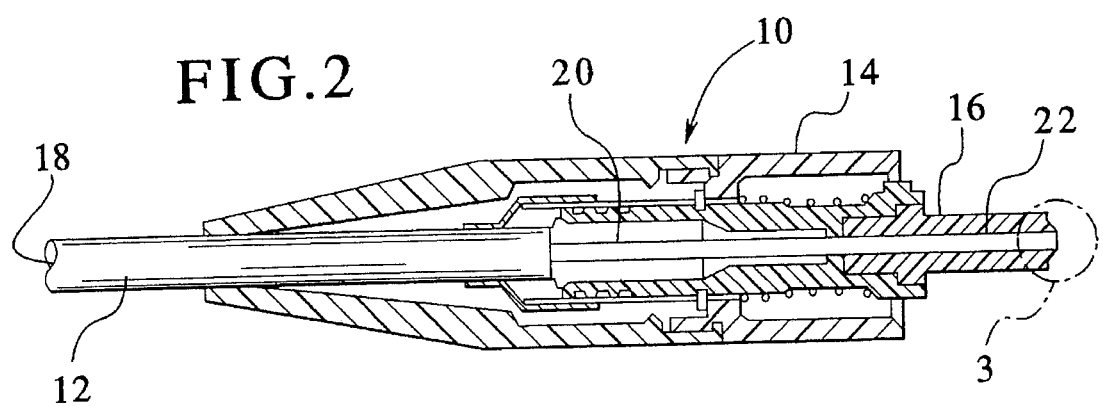
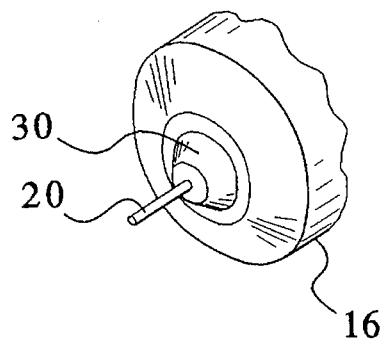 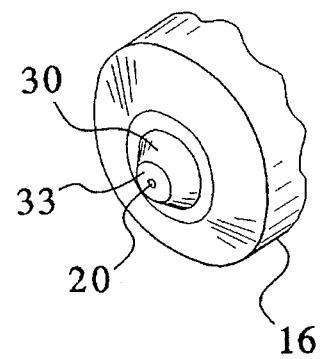 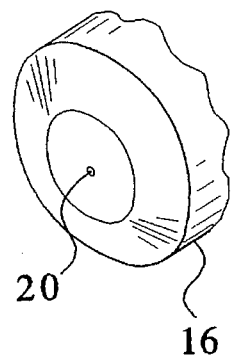

PLASTIC FIBER ALIGNMENT FERRULE AND TERMINATION METHOD

BACKGROUND OF THE INVENTION

This invention pertains to fiber optical connectors, and more particularly, to an alignment ferrule for a fiber optical connector made from injection molded plastic and bonding of the fiber to the ferrule using an anaerobic adhesive to quickly bond the fiber and leave a smoothly polished end surface on the ferrule. In other aspects, this invention pertains to a method of terminating a fiber optical connector using an injection molded plastic ferrule with a raised pedestal at one end.

It is known in the art to make a fiber optical connector by securing a fiber optic cable to a ceramic or plastic ferrule. The ferrule is generally cylindrical and has an opening extending therethrough. The opening has a diameter slightly larger than the diameter of the fiber. The fiber, which protrudes from an end of the cable, is inserted through the opening in the ferrule. Generally, bonding of the fiber to the ferrule using adhesives does not occur until the connector is placed in an oven for curing. It is also known in the art to use mechanical and adhesive bonding techniques. Mechanical crimping of the optical fiber cable to a connector does not provide for the precise positioning and bonding of the fiber to the ferrule.

Adhesive compositions have been used and designed specifically for ceramic ferrules but require extended curing times. For example, thermoplastic resins and epoxy are known for bonding to ceramic ferrules. An adhesive, such as epoxy, is introduced into the opening in the ferrule. Epoxy is usually injected into the rear ferrule body and through the ferrule to the ferrule end surface. The bare fiber protruding from the end of a cable is inserted into the rear of the ferrule body and through the opening in the ferrule until it extends from the end surface of the ferrule. The epoxy bonds the fiber to the ferrule after being cured in an oven for approximately ten to twenty minutes and allowed to cool for approximately three minutes. The end of the fiber protruding from the ferrule and the epoxy is then cleaved using cleaving tool. Epoxy surrounding the fiber adjacent the end of the ferrule causes difficulty in locating the cleave position. The fiber is cleaved as close as possible to the end surface without causing cracking of the fiber below the end surface of the ferrule. The epoxy surrounds the fiber sticking out from the end surface of the ferrule in a manner making the fiber susceptible to cracking upon cleaving. The fiber could undesirably shear below the end surface of the ferrule due to the resiliency of the epoxy bead. Polishing the end of the ferrule to bring the fiber to the end surface can be difficult and often results in undesirably polishing away more ferrule than is needed or desired. As the epoxy bead is cured to a hard state an abrasive 12 micron grit polishing lapping film of aluminum oxide must be used to remove the epoxy bead. Such a process may cause over polishing at the end face, causing the fiber to be attenuated. Epoxy beads have been known to shear away from the ferrule end surface during polishing. The fiber might undesirably break below the end surface of the ferrule or crack. Since it is difficult to predict how the fiber will be severed after it is cleaved, proper polishing of the ferrule end is a problem, unless extremely careful polishing methods are followed.

The cost of the ceramic material in a ferrule and the processing of same is considerably more than the cost of a plastic ferrule and its processing, hence, it would be desirable to utilize a relatively inexpensive plastic. Further, it is desired to automate the process of assembling an optical fiber to a ferrule. Present ferrules of either ceramic or plastic do not have a relatively fixed point of extension of the fiber from the ferrule during assembly and thus do not lend themselves readily to automation.

Accordingly, it is an object of the present invention to provide a molded plastic fiber optic ferrule having a pedestal at one end which is easily terminated.

A further object of the present invention is to provide a method of terminating a molded plastic ferrule for a fiber optic connector quickly and inexpensively and which overcomes disadvantages and deficiencies of prior ferrules and bonding techniques.

Another object of the present invention is to provide a method of terminating a molded plastic ferrule for a fiber optic connector using an adhesive for bonding specifically with plastic to achieve a cleanly and securely bonded fiber having attenuation equivalent to ceramic ferrules.

A further object of the present invention is to provide a ferrule which provides for quick and easy polishing and removal of the fiber.

Yet another object of this invention is to provide a molded plastic 2.5 mm ferrule for a fiber optic connector having a raised pedestal adjacent one end surrounding the fiber, for facilitating manufacture of the ferrule with a uniformly polished end surface. Other objects and advantages of this invention will be made more apparent hereinafter.

SUMMARY OF THE INVENTION

A principal object of this invention is to provide a molded plastic fiber ferrule for a fiber optic connector, comprising an elongated body having an opening therethrough. The opening having an entry end and an exit end and a fiber bonded within the opening with an anaerobic adhesive composition. The anaerobic adhesive composition includes a hardener characterized by a viscosity of between 500 and 7,000 cP and a shear strength of greater than 3,000 psi. The hardener includes aromatic dimethacrylate ester, hydroxyalkyl methacrylate, and bisphenol A fumarate resin.

This invention provides a method of making a fiber optic connector comprising the steps of forming a plastic ferrule comprising an elongated body having an opening therethrough and the opening having an entry end and an exit end for facilitating entry of a fiber. The ferrule has a raised pedestal surrounding the exit end of the opening. The method further includes applying a primer to a stripped fiber, injecting a hardener into the opening, introducing a fiber into the opening for extension through the exit end and beyond the raised pedestal, removing the excess fiber, severing the free end of the fiber, and polishing the ferrule to remove the raised pedestal and provide a smoothly polished end surface on the ferrule. The method includes an anaerobic adhesive composition including a hardener characterized by a viscosity of between 500 and 7,000 cP and a shear strength of greater than 3,000 psi. The method includes hardener including aromatic dimethacrylate ester, hydroxyalkyl methacrylate, and bisphenol A fumarate resin. The method wherein the fiber is removed via a cleaving tool. In an alternative embodiment, the method wherein the fiber is broken by striking the fiber against a hard surface or breaking using a finger instead of cleaving.

The invention further provides a method of terminating a fiber optic plastic ferrule comprising the steps of applying primer to a stripped fiber, injecting a hardener having a viscosity of between 500 and 7,000 cP and a shear strength of greater than 3,000 psi into an opening of the ferrule, introducing the fiber into the opening for extension beyond the end surface of the ferrule, removing the excess fiber, and polishing the ferrule and fiber to provide a smoothly polished end surface on the ferrule.

These and other features of the invention are set forth below in the following detailed description of the presently preferred embodiments.

BRIEF DESCRIPTION OF THE DRAWINGS

FIG. 1 is a perspective view of fiber optical connector embodying the present invention;

FIG. 2 is a longitudinal cross section of the fiber optical connector of FIG. 1;

FIG. 3 is an enlarged detail view of an end of the ferrule of the fiber optical connector of FIG. 2 prior to polishing and illustrating the raised pedestal, which surrounds the outlet end of the opening through the ferrule;

FIG. 4 is a detailed perspective view illustrating the position of the fiber in the ferrule at the beginning of assembly of the fiber to the ferrule;

FIG. 5 is a detailed perspective view illustrating the fiber cleaved at the pedestal surface; and FIG. 6 is a detailed perspective view illustrating the end of the ferrule after polishing is complete and the pedestal is removed.

DETAILED DESCRIPTION OF A PRESENTLY PREFERRED EMBODIMENTS

Referring to FIGS. 1–3, there is shown a fiber optic connector 10 for a cable 12 which includes within housing 14, the plastic ferrule 16 of the present invention. The cable 12 is of conventional construction and includes a protective coating or jacket 18 surrounding strain members (not shown) and the fiber 20, which fiber is secured within ferrule 16, as will be more fully explained hereinafter.

The ferrule 16 is injection molded, preferably from a partially glass filled or mineral filled resin, such as polyphenylene sulfide (PPS) or liquid crystal polymer (LCP). The plastic ferrule 16 is relatively inexpensive as compared to a ceramic ferrule. The ferrule 16 has a longitudinal opening or passage 22 therethrough. The entry end of the opening 22 is tapered to facilitate entry of the fiber 20 during assembly of the fiber within the ferrule.

A 2.5 mm ferrule is currently standard in the industry. The ferrule 16 of the present invention is injection molded of a plastic or polymer material and includes a pedestal 30 integral with the body of the ferrule 16, extending outwardly from the end surface 32. The pedestal 30 is annular and surrounds the opening 22 in ferrule 16. Preferably, the height of the pedestal is at least equal to the diameter of the fiber 20. The pedestal 30 provides a consistent and dependable support for the fiber 20 while cleaving and polishing.

In the termination process, the optical fiber is stripped by removing its buffer for a distance of ⅛ inch to ¼ inch of the end. The stripped portion of the fiber 20 precedes the buffered portion and aids in the alignment of the rear of the ferrule 16 with the buffer fiber during the assembly operation. In a preferred method of terminating the fiber 20, the following steps are followed:

a. Place the cable through the boot and strip the cable to the appropriate lengths exposing the fiber.

b. Clean the fiber and buffer with isopropyl alcohol allowing a few seconds for the alcohol to evaporate.

c. Paint the fiber and buffer with a primer using the small brush attached to the cap of the glass bottle, two liberal coatings will be sufficient. In a preferred embodiment, Locquic® Primer N 7649 (Loctite Corp., Rocky Hill, Conn.) is used, having a composition of acetone 95–100%; 2-ethylhexanoic acid 0.1–1%; organo-copper compound 0.1–1%, and trialkylammonium carboxylate 0.1–1% and a viscosity of 1–10 cP.

d. The primer is allowed one minute to dry to the surface of the buffer and fiber.

e. Place the applicator tip on the bottle containing a hardener. In a preferred embodiment, RC™680 Retaining Compound High Strength (Loctite Corp., Rocky Hill, Conn.) is used having a composition of aromatic dimethacrylate ester 40–45%; hydroxyalkyl methacrylate 30–35%; bisphenol A fumarate resin 15–20%; cumene hydroperoxide 1–3%; 1-acetyl-2-phenylhydrazine 0.1%; N,N-dialkyltoluidines 0.1–1%; maleic acid 0.1–1%; and saccharin 0.1–1%. This compound has a viscosity of between 500 and 7,000 cP; a shear strength of greater than 3,000 psi; and a temperature range of −54° to 149° C.

f. Insert the applicator into the backbone of the connector until it bottoms out against the ferrule.

g. With the ferrule tip visible, inject the hardener until the green liquid is seen exiting at the tip of the pedestal.

h. Insert the prepared fiber into the rear of the connector; gently rotate and push the fiber through until the fiber is in its home position with the rear of the connector body seated against the cable jacket and the free end of the fiber 20 extending beyond the pedestal 30. The hardener will bond upon impact with the primer on the fiber.

i. Splay out the kevlars and slide up the crimp sleeve until it encapsulates all of the kevlar; place the crimp tool behind the coupling nut with the larger diameter of the crimp sleeve over the backbone, crimp the smaller end of the crimp sleeve, and place the boot onto the connector backbone.

j. Allow one minute for the anaerobic adhesive to fully bond.

Following the termination procedure, the fiber is cleaved and polished as shown in FIGS. 4–6. The fiber 20 is cleaved adjacent the surface 40 of the pedestal 30 using a diamond or like tipped tool. The pedestal 30 is integrally formed with the ferrule 16 and supports the fiber 20 and provides for a "strain relief" surface to absorb the forces placed on the fiber during the removal or cleaving process. Such strain relief by the pedestal 30 reduces the chances of cracking or uneven severing of the fiber below the end surface 32 of the ferrule which occurs frequently with prior art ceramic ferrules with epoxy beads. The free end of the fiber 20 is removed and is substantially coincident with the end face 33 of the pedestal 30.

To remove the pedestal 30, the ferrule 16 is inserted into a polishing fixture comprising a generally circular base of substantial diameter (on the order of 1 to 1 ½ inches), with a cylinder extending from the base. The cylinder has a hole for receiving the ferrule 16. The fixture is positioned over an abrasive sheet on the order of 10–12 microns. The abrasive sheet preferably comprises an aluminum oxide film. The end of the ferrule 16 engages the abrasive sheet. The fixture 20 is moved to make about 20 revolutions or circular strokes to remove the raised pedestal 30. As the pedestal is formed of a plastic material which is compliant relative to prior art ceramic ferrules and epoxy beads, the pedestal is removed quite easily. Thus, there is little risk of over-polishing of the fiber and no attenuation occurs from the pedestal removal procedure; unlike prior art, procedures which have higher chances of harming the fiber. Prior art termination methods following cleaving have an epoxy bead remaining at the flat end face of the ceramic ferrule. As the cured epoxy bead has less compliance than the plastic material of the present invention, extended polishing may be required to remove the bead. Such a procedure is likely to cause over-polishing which may harm the fiber and result in attenuation. Due to the raised pedestal of the present invention used in combination with an anaerobic adhesive, over-polishing is unlikely. The end surface of ferrule 16 is cleaned with alcohol. Polishing is completed by placing a sheet of 0.3 micron abrasive and completing 5–10 circular strokes approximately 2 inches in director.

If a rounded end is desired on the ferrule, the abrasive sheet may be positioned on a resilient surface, e.g., a sheet of rubber. If a flat end is desired on the ferrule, the abrasive sheet may be positioned on a relatively hard surface, e.g., a glass plate. In any case, the resultant surface finish on the end surface of the injection-molded ferrule is at least equal to or better than that of the finish on a ceramic ferrule, at a small fraction of the price of the ceramic ferrule and more quickly than previous bonding techniques. Further, no oven for curing is necessary, making the termination process less costly and easier to accomplish in the field.

The polished end surface of the ferrule can be relatively easily held at a fixed distance from the opposite end of the ferrule. This permits the female of the present invention to be more readily adapted to automated manufacture of a connector. The pedestal feature eliminates the need for an epoxy bead, therefore reducing the installation time, as well as the scrap. Further, the pedestal 30 reduces the mount of expensive lapping film consumed by reducing the amount of ferrule material to be removed in the polishing process.

In a slightly altered termination process, the fiber is bonded to the ferule as discussed above. However, a quick-removal technique may be used for the removal of the extending optical fiber. Such an improved and quick removal technique may be used due to the presence of the pedestal shape on the ferrule, without need of a diamond tipped cleaving tool. The ferrule with the bonded fiber protruding therefrom may be struck against a hard surface or broken with a finger to remove the fiber 20. Due to the resilient protruding pedestal, the fiber will cleave at the end face 33 of the pedestal 30 and will not cleave below the end surface 32 of the ferrule 16.

The present invention is easily adapted for the standard 2.5 millimeter ferrule in use commercially. Though the connector is shown with a single ferrule, it is understood that the invention can readily be used with connectors having multiple ferrules and fibers.

While we have shown a presently preferred embodiment of the present invention, it will be understood that various changes and modifications may be made in the invention and it is intended that the invention will be limited only within the scope of the appended claims. It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. A molded plastic ferrule for a fiber optic connector comprising an elongated body having an opening therethrough, said opening having an entry end and an exit end surrounded by a raised pedestal and the exit end having a strain relief member formed by the raised pedestal and an anaerobic adhesive composition injected only within the exit end opening and not to the rest of the ferrule surrounding and supporting a fiber bonded within the raised pedestal with the anaerobic adhesive composition wherein the fiber may be easily cleaved and polished.

2. A molded plastic ferrule as in claim 1 wherein the anaerobic adhesive composition includes a hardener characterized by a viscosity of between 500 and 7,000 cP and a shear strength of greater than 3,000 psi.

3. The molded plastic ferrule of claim 2 wherein the hardener includes aromatic dimethacrylate ester, hydroxyalcyl methacrylate, and bisphenol A fumarate resin.

4. A method of making a fiber optic connector comprising the steps of forming a plastic ferrule comprising an elongated body having an opening therethrough, said opening having an entry end and an exit end for facilitating entry of a fiber, said ferrule having a raised pedestal surrounding the exit end of the opening, applying primer to a stripped fiber, injecting a hardener into the exit end at the raised pedestal to form a strain relief member, introducing a fiber into said opening for extension through said exit end and beyond said raised pedestal, cleaving the fiber adjacent the raised pedestal, severing the free end of the fiber, and polishing the ferrule to remove the raised pedestal and provide a smoothly polished end surface on the ferrule.

5. A method as in claim 4 wherein the hardener is characterized by a viscosity of between 500 and 7,000 cP and a shear strength of greater than 3,000 psi.

6. A method as in claim 4 wherein the hardener includes aromatic dimethacrylate ester, hydroxyalcyl methacrylate, and bisphenol A fumarate resin.

7. A method as in claim 4 wherein the fiber is removed by a cleaving tool.

8. A method as in claim 4 wherein the fiber is removed by breaking the fiber against a hard surface or with a finger.

9. A method of terminating a plastic ferrule comprising the steps of introducing an optical fiber into an opening of the ferrule, through an entry end and exit end adjacent a raised pedestal and beyond an end surface of the ferrule, bonding the fiber with an anaerobic adhesive composition only within the exit at the raised pedestal and not to the rest of the ferrule in order to form a strain relief member, removing the excess fiber and polishing the ferrule to provide a smoothly polished end surface on the ferrule.

10. A method as in claim 9 wherein the anaerobic adhesive composition includes a hardener having a viscosity between 500 and 7,000 cP and a shear strength of greater than 3,000 psi and a primer having a viscosity between 1 and 10 cP.

* * * * *